Figure 1:
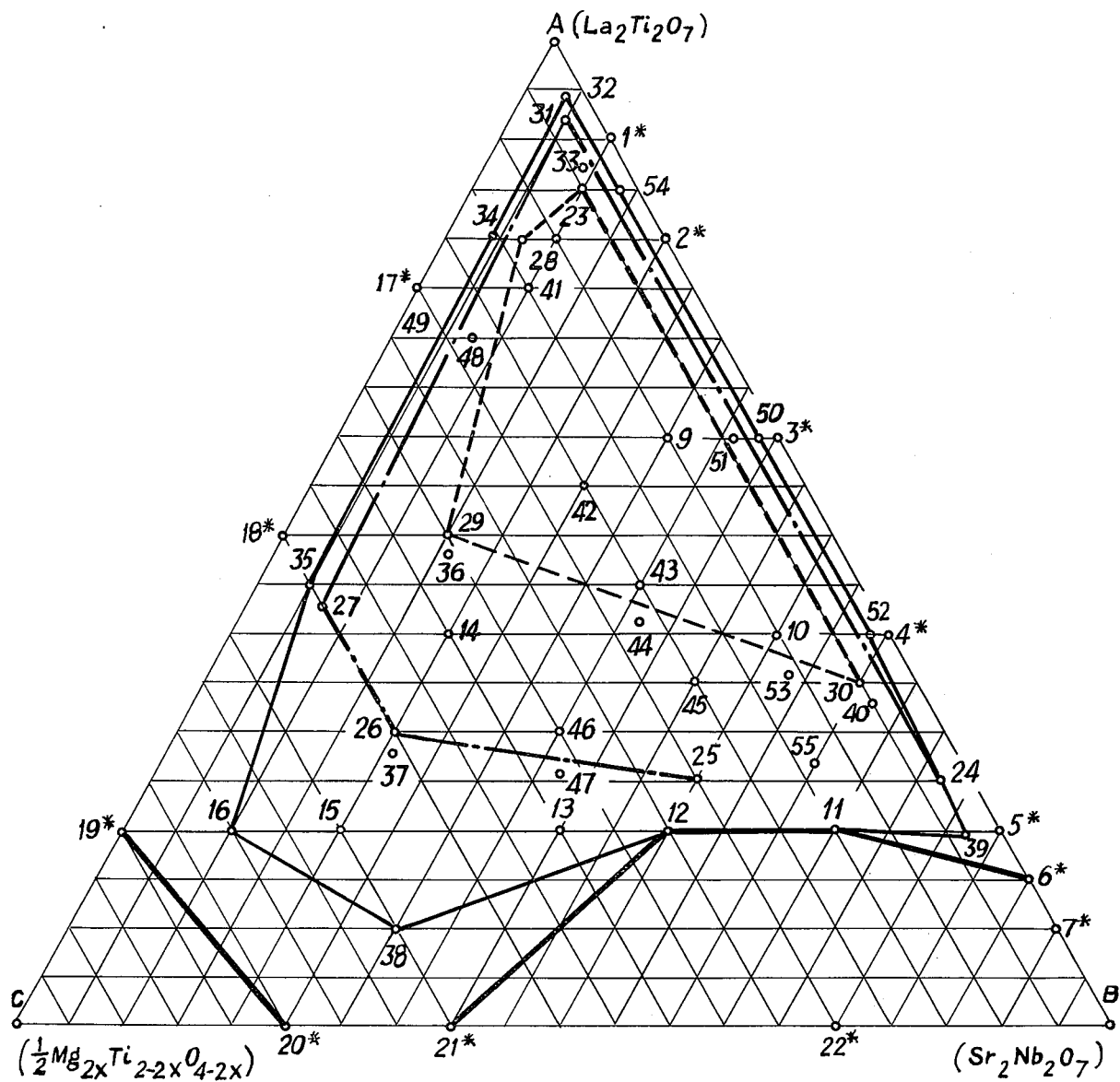

United States Patent [19]

Nakai et al.

[11] 4,030,937

[45] June 21, 1977

[54] CERAMIC DIELECTRIC MATERIAL HAVING IMPROVED TEMPERATURE STABILITY

[75] Inventors: Tomotoshi Nakai; Kazuaki Utsumi; Tomeji Ohno, all of Tokyo, Japan

[73] Assignee: Nippon Electric Co., Ltd., Tokyo, Japan

[22] Filed: Apr. 2, 1976

[21] Appl. No.: 673,120

[30] Foreign Application Priority Data

Apr. 9, 1975 Japan .............................. 50-43592

[52] U.S. Cl. .............................. 106/73.2; 252/63.5; 252/520; 252/521; 106/73.3
[51] Int. Cl.² .................... H01B 3/12; C04B 35/46; C04B 35/50
[58] Field of Search ................. 252/521, 520, 63.5; 106/73.2, 73.3

[56] References Cited

UNITED STATES PATENTS

| 2,520,376 | 8/1950 | Roup et al. | 252/63.5 |
| 3,184,660 | 5/1965 | Robinson | 252/63.5 |
| 3,431,124 | 3/1969 | Hayashi et al. | 106/73.2 |
| 3,682,766 | 8/1972 | Maher | 106/73.2 |

*Primary Examiner*—Patrick P. Garvin
*Assistant Examiner*—Mark Bell
*Attorney, Agent, or Firm*—Hopgood, Calimafde, Kalil, Blaustein and Lieberman

[57] ABSTRACT

A ceramic dielectric material according to the present invention has a composition consisting essentially of $La_2Ti_2O_7$, $Sr_2Nb_2O_7$, and $½Mg_{2x}—Ti_{2-2x}O_{4-2x}$, where $x$ lies in a range of 0 to 1.0. This material has a relatively large dielectric constant, a very stable temperature coefficient of the dielectric constant over a wide temperature range, a widely controllable value of the temperature coefficient of the dielectric constant, and a small dielectric loss. The temperature coefficient of the dielectric constant can be determined optionally in a wide range of value by simply changing the ratios among the three constituents of the composition.

8 Claims, 1 Drawing Figure

CERAMIC DIELECTRIC MATERIAL HAVING IMPROVED TEMPERATURE STABILITY

BACKGROUND OF THE INVENTION

This invention relates to a ceramic dielectric material, and more particularly to a ceramic material having stable temperature coefficient of dielectric constant and suited for temperature-compensating capacitors.

Temperature-compensating ceramic capacitors find a wide use as circuit elements in communication equipments, color television receivers and so forth in order to compensate temperature characteristics of other circuit elements used in such equipments. For example, in LC circuits such as reasonance circuits or filter circuits, a temperature-compensating capacitor using a dielectric material of a constant negative temperature coefficient of a dielectric constant compensate a positive temperature coefficient of inductance so that frequency characteristics of such circuits remain constant in spite of change in atmospheric temperature.

However, it has been long desired that the aforesaid capacitors provide a high dielectric constant ($\epsilon$), low dielectric loss (tan $\delta$), and a temperature coefficient of a dielectric constant ($TK_\epsilon$) maintained at a desired, constant value at varying temperatures. It follows from this that a dielectric material for use in a temperature-compensating ceramic capacitor is desired to have the aforesaid characteristics. Known as dielectric materials of this kind are compositions consisting essentially of any one of $SrTiO_3$, $CaTiO_3$, $MgTiO_3$, $CaZrO_3$, and the like. These materials however suffer from shortcomings, in that the value of a dielectric constant ($\epsilon$) is as low as 30 to 16, in case the temperature coefficient of a dielectric constant ($TK_\epsilon$) is set to a low value, and the temperature dependency of a temperature coefficient of a dielectric constant ($TK_\epsilon$), i.e., the variation of $TK_\epsilon$ at varying temperature is as high as $\pm 60$ PPm/°C, and in that, in case the temperature coefficient of a dielectric constant ($TK_\epsilon$) is set to a high value, the temperature coefficient of dielectric constant ($TK_\epsilon$) varies over a wide range at varying temperatures. In order words, the temperature-stability of $TK_\epsilon$ of such materials is poor.

There has been proposed attempts for overcoming these shortcomings. For example, ceramic compositions of $MgO-La_2O_3-TiO_2$ system and $MgO-Nd_2O_4-TiO_2$ system have been proposed in Journal of the American Ceramic Society, Discussions and Note, November, 1960, P609, and ceramic compositions of $La_2O_3-TiO_2-MgO$ system have been proposed previously. These ceramic compositions achieve a success in providing almost zero temperature coefficient, with the accompanying some improvements in the temperature dependency of a temperature coefficient. These materials however still have little possibility of adjusting the temperatures coefficient to a desired value, depending on the intended use.

It is an object of the present invention to provide ceramic compositions having an improved temperature coefficient of a dielectric constant.

It is another object of the present invention to provide ceramic compositions capable of having an optional value of temperature coefficient of a dielectric constant with the temperature coefficient per se being stable against temperature variation.

It is still further object of the present invention to provide ceramic compositions of a high electric constant and low dielectric loss.

DESCRIPTION OF THE INVENTION

The ceramic material of the invention is featured by the composition consisting essentially of $La_2Ti_2O_7$, $Sr_2Nb_2O_7$ and $\frac{1}{2}Mg_{2x}Ti_{2-2x}O_{4-2x}$ ($0 \leq X \leq 1.0$). In more particular, where the composition is represented by the formula $$\alpha[LaTiO_3] \cdot \beta[Sr_2Nb_2O_7] \cdot \gamma[\tfrac{1}{2}Mg_{2x}Ti_{2-2x}O_{4-2x}],$$

wherein $\alpha + \beta + \gamma = 1.0$, the compositions of the invention falls within the first polygonal region surrounded by the line running through the points A1-B1-C1-D1-D1-F1-G1 on a ternary coordinate plane. Compositions lying on the lines A1-B1, C1-D1, and G1-A1 are excluded. The values of the points A1 to G1 are as follows:

|    | $\alpha$ | $\beta$ | $\gamma$ |
|----|------|------|------|
| A1 | 1.00 | 0    | 0    |
| B1 | 0.20 | 0    | 0.80 |
| C1 | 0    | 0.25 | 0.75 |
| D1 | 0    | 0.40 | 0.60 |
| E1 | 0.20 | 0.50 | 0.30 |
| F1 | 0.20 | 0.65 | 0.15 |
| G1 | 0.15 | 0.85 | 0    |

Favourably, the composition of the invention falls within the second polygonal region surrounded by the line running through the points A2-B2-C2-D2-E2-F2-G2-H2-I2, on a ternary coordinate plane. Compositions on the lines are included. The values of the points A2 to I2 are as follows:

|    | $\alpha$ | $\beta$ | $\gamma$ |
|----|-------|-------|-------|
| A2 | 0.94  | 0.04  | 0.02  |
| B2 | 0.45  | 0.05  | 0.50  |
| C2 | 0.20  | 0.10  | 0.70  |
| D2 | 0.10  | 0.30  | 0.60  |
| E2 | 0.20  | 0.50  | 0.30  |
| F2 | 0.20  | 0.65  | 0.15  |
| G2 | 0.194 | 0.774 | 0.032 |
| H2 | 0.25  | 0.72  | 0.03  |
| I2 | 0.40  | 0.58  | 0.02  |

The dielectric material of the invention characterized by the above-mentioned composition has the stable characteristic of the temperature coefficient of a dielectric constant ($TK_\epsilon$), the variations of which falls within $\pm 30$ PPm/°C or $\pm 10\%$ of $TK_\epsilon$ over a wide temperature range ($-30°$ C $-+85°$ C). And the dielectric material having an optional values of the temperature coefficient of a dielectric constant ($TK_\epsilon$) can be obtained easily by simply changing ratios among the three constituents of the composition. Furthermore the dielectric material of the invention has an advantage in production thereof. Namely, the sintering temperature for the compositions of the invention is as low as 1300° to 1450° C, and hence the compositions are easy to be produced. The advantages mentioned above are realized in the compositions in which $x$ lies from 0 to 1.0. Where $x$ lies in a range of 0.05 to 0.60, the dielectric constant ($\epsilon$) can be increased and the stability of $TK_\epsilon$ against temperature variation can be further improved.

Furthermore, in the case that the dielectric constant ($\epsilon$) is required to be over 55.0 and the variation of the temperature coefficient of a dielectric constant ($TK_\epsilon$) is required to be within ± 30 PPm/° C, the composition of the invention should fall within a third polygonal region surounded by the line running through the points A3-B3-C3-D3-E3 on a ternary coordinate. Compositions on the lines are included. The values of the points A3 to E3 are as follows:

|    | α    | β    | γ    |
|----|------|------|------|
| A3 | 0.92 | 0.05 | 0.03 |
| B3 | 0.25 | 0.72 | 0.03 |
| C3 | 0.25 | 0.50 | 0.25 |
| D3 | 0.30 | 0.20 | 0.50 |
| E3 | 0.43 | 0.07 | 0.50 |

In this case, $x$ favorably lies in a range of 0.05 to 0.60.

Furthermore, in the case that the dielectric constant ($\epsilon$) is required to be over 55.0 and the variation of the temperature coefficient of a dielectric constant is required to be within ± 20 PPm/° C, the composition of the invention should fall within the fourth polygonal region surrounded by the line running through the points A4-B4-C4-D4 on a ternary coordinate plane. Compositions on the lines are included. The values of the points A4 to D4 are as follows:

|    | α    | β    | γ    |
|----|------|------|------|
| A4 | 0.85 | 0.10 | 0.05 |
| B4 | 0.35 | 0.60 | 0.05 |
| C4 | 0.50 | 0.15 | 0.35 |
| D4 | 0.80 | 0.07 | 0.13 |

In this case, $x$ preferably lies in a range of 0.05 to 0.60.

FIG. 1 is a ternary coordinate plane showing compositions given in the examples according to the present invention, in which a character A given therein represents $La_2Ti_2O_7$, B does $Sr_2Nb_2O_7$, and C does ½ $Mg_{2x}Ti_{2-2x}O_{4-2x}$ ($0 \leq X \leq 1.0$).

DESCRIPTION OF THE EXAMPLES

In order to produce examples of the ceramic compositions of the invention, powdered $La_2O_3$, $TiO_2$, $SrCO_3$, $Nb_2O_5$, and MgO were used as starting material. For the compositions in which $x$ is zero, use of MgO is of course not necessary. These starting materials were weighed to obtain desired compositions, and mixed by means of a ball mill, followed by filtration, drying and pre-sintering at temperatures of 1000° C to 1200° C for two hours. Thereafter, the starting materials thus prepared were molded into the form of dics having a diameter of 16 mm, and then these discs were sintered at temperature of 1300° C to 1450° C for one to two hours. Silver electrodes were then bonded to the both surfaces of the ceramic discs thus obtained, by baking the same at a temperature of 600° C, after which dielectric characteristics were measured. In other words, the dielectric constant ($\epsilon$) and dielectric loss (tan δ) were measured at a frequencey of 1 kHz by using a capacitance bridge. The temperature coefficient of the dielectric constant ($TK_\epsilon$) was determined by measuring dielectric constants at the respective temperatures of −30° C, 0° C, 20° C, 55° C and 85° C, and calculating according to the following formula, with the dielectric constant ($\epsilon$) at 20° C being taken as a reference value:

$$TK_\epsilon = \frac{\epsilon_T - \epsilon_{20}}{\epsilon_{20}(T-20)},$$

wherein $TK_\epsilon$ represents a temperature coefficient of $\epsilon$ (PPm/° C) and $\epsilon_{20}$ denotes the value of $\epsilon$ at 20° C, while $\epsilon T$ denotes the value of $\epsilon$ at T° C and T denotes the temperature measured. Typical examples of values thus measured are listed in Table 1. The compositions in Table 1 are shown by black dots in FIG. 1 with the same numerals as the specimen numbers for the sake of reference. The mark ± in the column of $TK_\epsilon$ in Table 1 signifies that temperature coefficients at the respective temperatures of −30° C to 85° C fall within a range defined by plus and minus values. In other words, values after ± denote the variations of $TK_\epsilon$ due to change in temperature. Specimens shown with an asterisk in the table are compositions outside the scope of the present invention. In the hyphenated specimen numbers 8-1 to 10-2, 12-1 to 16-3, 23-1 to 37-3, and 40-1 to 45-2, the numbers before the hyphen denote specimens defined by compositions of the ternary system and are dotted directly in FIG. 1 like the nonhyphenated specimen numbers. The numbers after the hyphen denote examples in which the value of $x$ is changed.

Table 1

| Specimen No. | Composition (mol %) $La_2Ti_2O_7$ | $Sr_2Nb_2O_7$ | ½$Mg_{2x}Ti_{2-2x}O_{4-2x}$ | x | $\epsilon$ at 20° C | tan δ x $10^{-4}$ (20° C) | $TK_\epsilon$ ppm/°C |
|---|---|---|---|---|---|---|---|
| 1* | 90 | 10 | 0 | — | 49.8 | 2.4 | +60 ± 5 |
| 2* | 80 | 20 | 0 | — | 52.5 | 1.8 | +90 ± 5 |
| 3* | 60 | 40 | 0 | — | 48.7 | 2.5 | +110 ± 10 |
| 4* | 40 | 60 | 0 | — | 50.2 | 2.8 | +100 ± 10 |
| 5* | 20 | 80 | 0 | — | 53.7 | 3.5 | −55 ± 10 |
| 6* | 15 | 85 | 0 | — | 54.1 | 3.2 | −150 ± 30 |
| 7* | 10 | 90 | 0 | — | 54.4 | 12.0 | −250 ± 70 |
| 8-1 | 80 | 10 | 10 | 1.00 | 51.4 | 0.9 | +50 ± 4 |
| 8-2 | 80 | 10 | 10 | 0.80 | 52.5 | 1.2 | +40 ± 5 |
| 8-3 | 80 | 10 | 10 | 0.50 | 57.3 | 1.4 | −10 ± 5 |
| 8-4 | 80 | 10 | 10 | 0.20 | 57.3 | 1.4 | −11 ± 10 |
| 8-5 | 80 | 10 | 10 | 0 | 57.2 | 1.6 | −15 ± 11 |
| 9-1 | 60 | 30 | 10 | 1.00 | 52.6 | 1.0 | −57 ± 3 |
| 9-2 | 60 | 30 | 10 | 0.80 | 53.1 | 1.5 | −48 ± 5 |
| 9-3 | 60 | 30 | 10 | 0.50 | 57.1 | 1.8 | −100 ± 5 |
| 9-4 | 60 | 30 | 10 | 0.20 | 60.2 | 1.5 | −108 ± 10 |
| 9-5 | 60 | 30 | 10 | 0 | 61.7 | 1.1 | −110 ± 10 |
| 10-1 | 40 | 50 | 10 | 1.00 | 46.5 | 4.0 | −90 ± 15 |
| 10-2 | 40 | 50 | 10 | 0.80 | 52.2 | 3.0 | −75 ± 10 |
| 11 | 20 | 65 | 15 | 0.80 | 62.0 | 2.2 | −200 ± 30 |
| 12-1 | 20 | 50 | 30 | 0.80 | 61.1 | 3.1 | −210 ± 30 |
| 12-2 | 20 | 50 | 30 | 0.20 | 95.1 | 3.5 | −480 ± 45 |
| 13-1 | 20 | 40 | 40 | 1.00 | 43.9 | 2.4 | −83 ± 3 |
| 13-2 | 20 | 40 | 40 | 0.80 | 60.2 | 2.8 | −240 ± 15 |
| 13-3 | 20 | 40 | 40 | 0.20 | 115 | 4.2 | −650 ± 55 |
| 13-4 | 20 | 40 | 40 | 0 | 164 | 5.0 | −830 ± 70 |

Table 1-continued

| Specimen No. | Composition (mol %) | | | x | ε at 20° C | tan δ × 10⁻⁴ (20° C) | TK$_ε$ ppm/°C |
|---|---|---|---|---|---|---|---|
| | La$_2$Ti$_2$O$_7$ | Sr$_2$Nb$_2$O$_7$ | ½Mg$_{2x}$Ti$_{2x}$O$_{4-2x}$ | | | | |
| 14-1 | 40 | 20 | 40 | 1.00 | 43.7 | 1.9 | +69 ± 2 |
| 14-2 | 40 | 20 | 40 | 0.80 | 53.8 | 2.1 | −105 ± 5 |
| 14-3 | 40 | 20 | 40 | 0.50 | 55.4 | 1.1 | −170 ± 5 |
| 14-4 | 40 | 20 | 40 | 0.20 | 67.5 | 1.9 | −310 ± 20 |
| 14-5 | 40 | 20 | 40 | 0 | 84.7 | 1.5 | −475 ± 25 |
| 15-1 | 20 | 20 | 60 | 1.00 | 38.1 | 1.8 | −50 ± 3 |
| 15-2 | 20 | 20 | 60 | 0.80 | 46.3 | 1.2 | −135 ± 15 |
| 15-3 | 20 | 20 | 60 | 0.50 | 43.7 | 2.6 | −130 ± 10 |
| 15-4 | 20 | 20 | 60 | 0.20 | 82.1 | 2.4 | −240 ± 30 |
| 16-1 | 20 | 10 | 70 | 1.00 | 35.6 | 1.3 | −38 ± 2 |
| 16-2 | 20 | 10 | 70 | 0.80 | 38.5 | 1.8 | −65 ± 5 |
| 16-3 | 20 | 10 | 70 | 0.20 | 60.0 | 3.0 | −150 ± 30 |
| 17* | 75 | 0 | 25 | 0.80 | 51.5 | 1.4 | +10 ± 5 |
| 18* | 50 | 0 | 50 | 0.80 | 45.0 | 4.0 | +22 ± 15 |
| 19* | 20 | 0 | 80 | 1.00 | 28.0 | 3.2 | +55 ± 10 |
| 20* | 0 | 25 | 75 | 0.80 | 29.2 | 2.2 | +80 ± 40 |
| 21* | 0 | 40 | 60 | 0.80 | 45.2 | 2.9 | −80 ± 40 |
| 22* | 0 | 75 | 25 | 1.00 | 59.7 | 30.0 | +450 ± 250 |
| 23-1 | 85 | 10 | 5 | 0.04 | 54.8 | 1.5 | +20 ± 5 |
| 23-2 | 85 | 10 | 5 | 0.05 | 55.0 | 1.4 | +20 ± 5 |
| 23-3 | 85 | 10 | 5 | 0.20 | 55.0 | 1.0 | +20 ± 5 |
| 23-4 | 85 | 10 | 5 | 0.50 | 55.0 | 1.4 | +20 ± 5 |
| 23-5 | 85 | 10 | 5 | 0.60 | 55.0 | 1.1 | +30 ± 5 |
| 23-6 | 85 | 10 | 5 | 0.61 | 54.7 | 1.1 | +30 ± 5 |
| 24-1 | 25 | 72 | 3 | 0.05 | 65.8 | 5.0 | −105 ± 30 |
| 24-2 | 25 | 72 | 3 | 0.20 | 55.0 | 3.5 | −75 ± 30 |
| 24-3 | 25 | 72 | 3 | 0.60 | 55.3 | 6.2 | −45 ± 30 |
| 24-4 | 25 | 72 | 3 | 0.61 | 54.8 | 6.0 | −45 ± 30 |
| 25-1 | 25 | 50 | 25 | 0.04 | 96.0 | 5.5 | −480 ± 33 |
| 25-2 | 25 | 50 | 25 | 0.05 | 95.5 | 5.5 | −480 ± 30 |
| 25-3 | 25 | 50 | 25 | 0.20 | 82.1 | 4.0 | −410 ± 30 |
| 25-4 | 25 | 50 | 25 | 0.60 | 68.5 | 2.5 | −350 ± 30 |
| 25-5 | 25 | 50 | 25 | 0.61 | 68.3 | 2.5 | −350 ± 32 |
| 26-1 | 30 | 20 | 50 | 0.04 | 85.5 | 2.0 | −490 ± 35 |
| 26-2 | 30 | 20 | 50 | 0.05 | 85.2 | 2.0 | −490 ± 30 |
| 26-3 | 30 | 20 | 50 | 0.20 | 75.5 | 2.5 | −278 ± 30 |
| 26-4 | 30 | 20 | 50 | 0.60 | 55.3 | 1.1 | −170 ± 10 |
| 27-1 | 43 | 7 | 50 | 0.05 | 55.5 | 2.0 | −220 ± 20 |
| 27-2 | 43 | 7 | 50 | 0.20 | 55.0 | 2.5 | −110 ± 20 |
| 27-3 | 43 | 7 | 50 | 0.60 | 55.0 | 1.1 | −70 ± 20 |
| 27-4 | 43 | 7 | 50 | 0.61 | 54.7 | 1.1 | −70 ± 20 |
| 28-1 | 80 | 7 | 13 | 0.04 | 54.8 | 1.5 | −5 ± 10 |
| 28-2 | 80 | 7 | 13 | 0.05 | 55.0 | 1.5 | −5 ± 10 |
| 28-3 | 80 | 7 | 13 | 0.20 | 55.0 | 1.2 | −5 ± 10 |
| 28-4 | 80 | 7 | 13 | 0.60 | 55.0 | 1.4 | +10 ± 15 |
| 28-5 | 80 | 7 | 13 | 0.61 | 54.8 | 1.4 | +10 ± 15 |
| 29-1 | 50 | 15 | 35 | 0.04 | 75.8 | 1.8 | −340 ± 18 |
| 29-2 | 50 | 15 | 35 | 0.05 | 75.4 | 1.8 | −340 ± 15 |
| 29-3 | 50 | 15 | 35 | 0.20 | 63.2 | 1.8 | −220 ± 15 |
| 29-4 | 50 | 15 | 35 | 0.60 | 65.0 | 1.0 | −150 ± 15 |
| 29-5 | 50 | 15 | 35 | 0.61 | 64.7 | 1.0 | −150 ± 18 |
| 30-1 | 35 | 60 | 5 | 0.04 | 58.7 | 1.7 | +5 × 17 |
| 30-2 | 35 | 60 | 5 | 0.05 | 58.3 | 1.7 | +5 ± 15 |
| 30-3 | 35 | 60 | 5 | 0.20 | 55.0 | 1.5 | +5 ± 15 |
| 30-4 | 35 | 60 | 5 | 0.60 | 55.0 | 2.0 | +20 ± 15 |
| 30-5 | 35 | 60 | 5 | 0.61 | 54.8 | 2.0 | +20 ± 15 |
| 31-1 | 92 | 5 | 3 | 0.05 | 55.0 | 1.8 | +35 ± 20 |
| 31-2 | 92 | 5 | 3 | 0.20 | 55.0 | 1.0 | +40 ± 30 |
| 31-3 | 92 | 5 | 3 | 0.60 | 55.0 | 2.0 | +40 ± 30 |
| 31-4 | 92 | 5 | 3 | 0.61 | 54.8 | 2.0 | +40 ± 40 |
| 32-1 | 94 | 4 | 2 | 0.05 | 54.6 | 1.8 | +35 ± 25 |
| 32-2 | 94 | 4 | 2 | 0.20 | 54.6 | 1.0 | +40 ± 30 |
| 32-3 | 94 | 4 | 2 | 0.60 | 54.5 | 2.2 | +40 ± 30 |
| 33-1 | 87 | 9 | 4 | 0.05 | 55.0 | 1.4 | +20 ± 20 |
| 33-2 | 87 | 9 | 4 | 0.20 | 55.0 | 1.0 | +20 ± 20 |
| 33-3 | 87 | 9 | 4 | 0.60 | 55.0 | 1.1 | +30 ± 20 |
| 34-1 | 80 | 5 | 15 | 0.05 | 54.8 | 1.3 | 0 ± 15 |
| 34-2 | 80 | 5 | 15 | 0.20 | 54.8 | 1.0 | 0 ± 15 |
| 34-3 | 80 | 5 | 15 | 0.60 | 54.6 | 1.0 | ±5 ± 15 |
| 35-1 | 45 | 5 | 50 | 0.05 | 52.5 | 2.0 | −160 ± 20 |
| 35-2 | 45 | 5 | 50 | 0.20 | 53.3 | 2.5 | −70 ± 20 |
| 35-3 | 45 | 5 | 50 | 0.60 | 54.5 | 1.1 | −50 ± 20 |
| 36-1 | 48 | 16 | 36 | 0.05 | 75.8 | 2.0 | −360 ± 20 |
| 36-2 | 48 | 16 | 36 | 0.20 | 63.5 | 2.0 | −220 ± 20 |
| 36-3 | 48 | 16 | 36 | 0.60 | 66.0 | 1.0 | −160 ± 20 |
| 37-1 | 28 | 21 | 51 | 0.05 | 85.0 | 1.8 | −480 ± 30 |
| 37-2 | 28 | 21 | 51 | 0.20 | 75.5 | 2.0 | −260 ± 30 |
| 37-3 | 28 | 21 | 51 | 0.60 | 54.8 | 1.0 | −160 ± 10 |
| 38 | 10 | 30 | 60 | 0.50 | 48.3 | 2.3 | −230 ± 20 |
| 39 | 19.4 | 77.4 | 3.2 | 0.50 | 55.4 | 9.5 | −100 ± 20 |
| 40-1 | 33 | 62 | 5 | 0.05 | 58.3 | 2.0 | ±5 ± 20 |
| 40-2 | 33 | 62 | 5 | 0.20 | 55.0 | 1.5 | +5 ± 20 |
| 40-3 | 33 | 62 | 5 | 0.60 | 54.4 | 2.0 | +15 ± 15 |
| 41-1 | 75 | 10 | 15 | 0.20 | 57.8 | 1.4 | −25 ± 10 |
| 41-2 | 75 | 10 | 15 | 0.60 | 56.5 | 1.1 | +5 ± 5 |
| 42-1 | 55 | 25 | 20 | 0.20 | 63.0 | 1.7 | −175 ± 10 |
| 42-2 | 55 | 25 | 20 | 0.60 | 59.2 | 1.8 | −105 ± 5 |
| 43-1 | 45 | 35 | 20 | 0.20 | 70.5 | 2.1 | −165 ± 15 |
| 43-2 | 45 | 35 | 20 | 0.60 | 57.0 | 1.6 | −150 ± 15 |
| 44-1 | 42 | 36 | 22 | 0.20 | 71.8 | 2.1 | −175 ± 16 |

Table 1-continued

| Specimen No. | Composition (mol %) La$_2$Ti$_2$O$_7$ | Sr$_2$Nb$_2$O$_7$ | ½Mg$_{2x}$Ti$_{2-x}$O$_{4-2x}$ | x | $\epsilon$ at 20° C | tan δ × 10$^{-4}$ (20° C) | TK$_\epsilon$ ppm/° C |
|---|---|---|---|---|---|---|---|
| 44-2 | 42 | 36 | 22 | 0.60 | 57.5 | 1.6 | −160 ± 17 |
| 45-1 | 35 | 45 | 20 | 0.20 | 80.3 | 3.0 | −300 ± 25 |
| 45-2 | 35 | 45 | 20 | 0.60 | 56.4 | 1.5 | −190 ± 20 |
| 46 | 30 | 35 | 35 | 0.20 | 78.5 | 3.1 | −440 ± 28 |
| 47 | 26 | 37 | 37 | 0.20 | 80.3 | 3.8 | −460 ± 32 |
| 48 | 65 | 7 | 28 | 0.20 | 55.2 | 1.4 | −5 ± 15 |
| 49 | 65 | 5 | 30 | 0.20 | 54.7 | 1.3 | ± 15 |
| 50 | 60 | 38 | 2 | 0.20 | 54.2 | 1.0 | +60 ± 10 |
| 51 | 60 | 36 | 4 | 0.20 | 55.2 | 1.0 | +5 ± 10 |
| 52 | 40 | 58 | 2 | 0.20 | 54.4 | 1.1 | +55 ± 10 |
| 53 | 36 | 53 | 11 | 0.20 | 65.3 | 2.5 | −120 ± 20 |
| 54 | 85 | 13 | 2 | 0.20 | 54.8 | 1.0 | +55 ± 10 |
| 55 | 26 | 60 | 14 | 0.40 | 70.5 | 3.0 | −120 ± 28 |

As is clear from Table 1, the specimens numbered 8 to 16 and 23 to 55 which lie within the first polygonal region defined by the line running through the points A-19-20-21-12-11-6-A but do not lie on the lines A-19, 20-21, and 6-A or which lie within the second polygonal region defined by the line running through the points 32-35-16-38-12-11-39-24-52 provide excellent characteristics such as high dielectric constants ($\epsilon$) and low dielectric loss (tan δ). Furthermore, such specimens reveal that the temperature coefficient of $\epsilon$ (TK$_\epsilon$) may be varied over a wide range of +110 PPm/° C to −830 PPm/° C by adjusting the compositional ratio of respective constituents. In addition, the variation in the temperature coefficient of $\epsilon$ (TK$_\epsilon$) according to temperature variation falls within a range of ±30 PPm/° C or ±10% of the temperature coefficient of $\epsilon$ (TK$_\epsilon$). On the other hand, the specimens numbered 1 to 7 and 17 to 22 which are on the lines A-19, 20-21, and 6-A or outside the first polygonal region in FIG. 1 fail to satisfy the requirement that the variation of the temperature coefficient of $\epsilon$ (TK$_\epsilon$) due to the temperature variation be within ±30 PPm/° C. The compositions outside of the scope of the present invention may satisfy either of the following two requirements, but fail to satisfy the both requirements: (i) the variation in TK$_\epsilon$ due to temperature variation falls with a range of ±30 PPm/° C or within ±10% of medium value of TK$_\epsilon$ and (ii) a dielectric constant ($\epsilon$) is over 30.

Furthermore, the composition 8 to 10, 14, 23 to 29, 40 to 46, 48, 30, 31, 33, 36, 53 and 55 which are within the third polygonal region defined by the line running through the points 31-27-26-25-24-31 with the line being included may provide a dielectric constant $\epsilon$ as high as over 55, as shown in Table 1, satisfying the requirement that the variation of TK$_\epsilon$ at varying temperature fall within ±30 PPm/° C. In this case, of x lies from 0.05 to 0.60, high dielectric constant is obtained.

Furthermore, the compositions 8 to 10, 23, 28 to 30, and 41 to 43 which are within the fourth polygonal region defined by the line running through the points 23-28-29-30-23 with the line itself included provide excellent characteristics that as shown in Table 1 the dielectric constant $\epsilon$ is over 55 and the variations of TK$_\epsilon$ due to temperature variation falls within a range of ±20 PPm/° C.

As is apparent from the foregoing, the compositions according to the present invention, even if the temperature coefficient of a dielectric constant (TK$_\epsilon$) is in the neighborhood of zero, provide dielectric constants as high as over 55, so that capacitors using these compositions as its dielectric may be reduced in size. In addition, the compositions according to the present invention provide desired characteristics over a wide temperature range, because of stability of the temperature coefficient of dielectric constant (TK$_\epsilon$) against the varying temperature. Still furthermore, even if absolute values of the temperature coefficient of a dielectric constant (TK$_\epsilon$) are large, variation in the temperature coefficient of dielectric constant (TK$_\epsilon$) due to the varying temperatures is very small, thereby maintaining TK$_\epsilon$ constant, so that the compositions according to the present invention may be widely applied to capacitors and/or to equipments using the same.

What is claimed is:

1. A ceramic composition containing La$_2$Ti$_2$O$_7$, Sr$_2$Nb$_2$O$_7$, and ½ Mg$_{2x}$Ti$_{2-2x}$O$_{4-2x}$, where $x$ lies in the range 0 to 1.0, represented as $$\alpha[La_2Ti_2O_7] \cdot \beta[Sr_2Nb_2O_7] \cdot \gamma[\tfrac{1}{2}Mg_{2x}Ti_{2-2x}O_{4-2x}].$$

where $\alpha + \beta + \gamma = 1.0$, and falling within the polygonal region surrounded by the lines A1-B1-C1-D1-E1-F1-G1 on a ternary coordinate plane, in which said A1, B1, C1, D1, E1, F1 and G1 have the values as follows:

|    | α | β | γ |
|---|---|---|---|
| A1 | 1.00 | 0 | 0 |
| B1 | 0.20 | 0 | 0.80 |
| C1 | 0 | 0.25 | 0.75 |
| D1 | 0 | 0.40 | 0.60 |
| E1 | 0.20 | 0.50 | 0.30 |
| F1 | 0.20 | 0.65 | 0.15 |
| G1 | 0.15 | 0.85 | 0 | and compositions on the line A1-B1, line C1-D1, and line G1-A1 being excluded from said composition.

2. A ceramic composition claimed in claim 1, wherein said $x$ lies in the range of 0.05 to 0.60.

3. A ceramic composition consisting essentially of La$_2$Ti$_2$O$_7$, Sr$_2$Nb$_2$O$_7$ and ½Mg$_{2x}$Ti$_{2-2x}$O$_{4-2x}$, where $x$ lies in the range from 0 to 1.0, said composition being represented as $$\alpha[La_2Ti_2O_7] \cdot \beta[Sr_2Nb_2O_7] \cdot \gamma[\tfrac{1}{2}Mg_{2x}Ti_{2-2x}O_{4-2x}].$$

where $\alpha + \gamma = 1.0$, and falling within the polygonal region surround by the line A2-B2-C2-D2E2-F2-G2-2 on a ternary coordinate plane, which said A2, B2, C2, D2, E2, F2, G2, H2 and I2 have the following values:

|    | α | β | γ |
|---|---|---|---|
| A2 | 0.94 | 0.04 | 0.02 |
| B2 | 0.45 | 0.05 | 0.50 |
| C2 | 0.20 | 0.10 | 0.70 |
| D2 | 0.10 | 0.30 | 0.60 |

-continued

|    | α     | β     | γ     |
|----|-------|-------|-------|
| E2 | 0.20  | 0.50  | 0.30  |
| F2 | 0.20  | 0.65  | 0.15  |
| G2 | 0.194 | 0.774 | 0.032 |
| H2 | 0.25  | 0.72  | 0.03  |
| I2 | 0.40  | 0.58  | 0.02. |

4. A ceramic composition claimed in claim 3, wherein said $x$ lies in the range of 0.05 to 0.60.

5. A ceramic composition consisting essentially of $La_2Ti_2O_7$, $Sr_2Nb_2O_7$ and $½Mg_{2x}Ti_{2-2x}O_{4-2x}$, where $x$ lies in the range from 0 to 1.0, said compositions being represented as $$\alpha[La_2Ti_2O_7] \cdot \beta[Sr_2Nb_2O_7] \cdot \gamma[½Mg_{2x}Ti_{2-2x}O_{4+2x}],$$

where $\alpha + \beta + \gamma = 1.2$, and falling within the polygonal region surrounded by the lines A3-B3-C3-D3-E3 on a ternary coordinate plane, in which said A3, B3, C3, D3, and E3 have the values as follows:

|    | α    | β    | γ    |
|----|------|------|------|
| A3 | 0.92 | 0.05 | 0.03 |
| B3 | 0.25 | 0.72 | 0.03 |
| C3 | 0.25 | 0.50 | 0.25 |

-continued

|    | α    | β    | γ     |
|----|------|------|-------|
| D3 | 0.30 | 0.20 | 0.50  |
| E3 | 0.43 | 0.07 | 0.50. |

6. A ceramic composition claimed in claim 4, wherein said $x$ lies in the range of 0.05 to 0.60.

7. A ceramic composition consisting essentially of $La_2Ti_2O_7$, $Sr_2Nb_2O_7$ and $½Mg_{2x}Ti_{2-2x}O_{4-2x}$, where $x$ lies from 0 to 1.0, said comparison being represented as $$\alpha[La_2Ti_2O_7] \cdot \beta[Sr_2Nb_2O_7] \cdot \beta[½Mg_{2x}Ti_{2-2x}O_{4-2x}],$$

where $\alpha+\beta+\gamma = 1.0$, and falling within the polygonal region surrounded by the lines A4-4-C4-D4 on a ternary coordinate plane, in which said A4, B4, C4 and D4 have the following values:

|    | α    | β    | γ     |
|----|------|------|-------|
| A4 | 0.85 | 0.10 | 0.05  |
| B4 | 0.35 | 0.60 | 0.05  |
| C4 | 0.50 | 0.15 | 0.35  |
| D4 | 0.80 | 0.07 | 0.13. |

8. A ceramic composition claimed in claim 6, wherein said $x$ lies in the range of 0.05 to 0.60.

* * * * *

UNITED STATES PATENT OFFICE
CERTIFICATE OF CORRECTION

Patent No. 4,030,937  Dated June 21, 1977

Inventor(s) Tomotoshi Nakai; Kazuaki Utsumi and Tomeji Ohno

It is certified that error appears in the above-identified patent and that said Letters Patent are hereby corrected as shown below:

Claim 1, column 8, line 29, "$La_2Tl_2O_7$" should be --$La_2Ti_2O_7$--.

column 8, lines 32-34, the middle of the formula, that is, "$\beta[Sr_2Nb_2O_7]$" should be --$\beta[Sr_2Nb_2O_7]$--; lines 32-34, the expression "$O_4{-}_{2x}]$" at the end of the formula should be --$O_{4-2x}]$--.

Claim 3, column 8, line 54, "$La_2Tl_2O_7$" should be --$La_2Ti_2O_7$--.

column 8, line 54, the expression "$O4-2x$" at the end of the third formula should be --$O_{4-2x}$--; lines 57-59, the formula should read as follows:

--$\alpha[La_2Ti_2O_7]\cdot\beta[Sr_2Nb_2O_7]\cdot\gamma[1/2\ Mg_{2x}Ti_{2-2x}O_{4-2x}]$-- column 8, line 59, "$\alpha+\gamma = 1.0$" should be --$\alpha+\beta+\gamma=1.0$--.

column 8, line 60, "surround" should be --surrounded--; "line" should be --lines--; same line, "A2-B2-C2-D2E2-F2-G2-2" should be --A2-B2-C2-D2-E2-F2-G2-H2-I2--.

column 8, line 61, "which said" should be --in which said--

Claim 5, column 9, lines 17-19, the "Sr" in the middle of the formula should be in larger type and lowered to the same level of "Nb".

column 9, line 20, "$\alpha+\beta+\gamma=1.2$" should be --$\alpha+\beta+\gamma=1.0$--

Claim 7, line 11, "comparison" should be --composition--; lines 12-14, in the formula, "$\beta$" second occurrence, should be --$\gamma$--.

UNITED STATES PATENT OFFICE
CERTIFICATE OF CORRECTION

Patent No. 4,030,937  Dated June 21, 1977

Inventor(s) Tomotoshi Nakai; Kazuaki Utsumi and Tomeji Ohno

It is certified that error appears in the above-identified patent and that said Letters Patent are hereby corrected as shown below:

Claim 7, line 16, "A4-4-C4-D4" should be --A4-B4-C4-D4--.

Signed and Sealed this

Thirteenth Day of June 1978

[SEAL]

Attest:

RUTH C. MASON
Attesting Officer

DONALD W. BANNER
Commissioner of Patents and Trademarks